United States Patent [19]

Blaser

[11] 4,343,992
[45] Aug. 10, 1982

[54] V-SHAPED CENTERING FIXTURE FOR OPTICAL ENCODERS

[76] Inventor: Anton J. Blaser, 700 E. Mason, Santa Barbara, Calif. 93103

[21] Appl. No.: 185,142

[22] Filed: Sep. 8, 1980

[51] Int. Cl.³ .............................................. G01D 5/34
[52] U.S. Cl. ................................ 250/231 SE; 29/271
[58] Field of Search ............. 250/231 SE, 237 G, 239; 356/395, 396, 399, 400; 340/347 P; 29/271

[56] References Cited

U.S. PATENT DOCUMENTS 3,900,732  8/1975  Costales ................................. 29/271
4,209,692  6/1980  Hudspeth ...................... 250/231 SE Primary Examiner—David C. Nelms
Attorney, Agent, or Firm—Ralph B. Pastoriza

[57] ABSTRACT

A V-shaped element has a central bore at its vertex of diameter corresponding to the diameter of the motor shaft upon which an optical encoder assembly is to be mounted. The arms of the V-shape extend radially at 90° to each other from the center of the bore at the vertex and terminate in engaging stops at precise equal radial distances from the center of the bore at the vertex. This radial distance corresponds precisely to the radius of the outside diameter of the circular periphery of the mounting member portion of the encoder assembly carrying the light source for the optical encoder. Exact concentric centering of the mounting member carrying the light source is maintained by the V-shaped element by engagement of the ends of the arms with the circular periphery of the mounting member while the motor shaft is received in the central bore so that the mounting member can be rigidly secured to the motor. Thereafter, the V-shaped element is removed and the remaining components of the optical encoder assembled with assurance of proper alignment between the light source and the photo cell part of the assembly.

4 Claims, 3 Drawing Figures

V-SHAPED CENTERING FIXTURE FOR OPTICAL ENCODERS

This invention relates generally to optical encoders provided in kit form for assembly on motor shafts to provide an output signal of a frequency determined by the R.P.M. of the motor. More particularly, the invention has to do with a unique centering fixture in combination with an optical encoder for facilitating the assembly of the optical encoder on the motor.

BACKGROUND OF THE INVENTION

Optical encoders or tachometers are well known in the art. Basically, these devices comprise a stationary light source arranged to be mounted on a motor close to the motor shaft, a stationary receiving photo electric cell in alignment with the light source and a rotating shutter arranged to be secured to the motor shaft to rotate between the light source and photo cell and thus optically generate a series of pulses of frequency corresponding to the R.P.M. of the motor. In these assemblies it is vitally important that the light source and photo cell be properly aligned with respect to the rotating shutter in order that usable output pulses are properly generated. Any misalignment could result in the absence of pulses or very weak pulses if the full apertures defined by the rotating shutter are not utilized.

There is generally no problem when an optical encoder is installed on a motor in the factory. Proper alignment jigs and the like are readily available and once the selection is complete on the motor, there is ordinarily no problem of misalignment unless an ultimate user attempts to disassemble the optical encoder from the motor and attempts to reassemble the same himself.

On the other hand, it is presently common practice to provide optical encoder kits which may be shipped directly to a user and assembled by the user himself on a motor. Normally, the basic component of the assembly constitutes a mounting member carrying the light source. This member is provided with a central opening normally of a size greater than the diameter of the motor shaft of any particular motor with which the encoder is to be used. The larger sized opening is necessary to provide a definite clearance between the rotating shaft and the mounting member itself carrying the light source which latter member is fixed to the motor casing in a position surrounding the shaft and is stationary. The next component of the assembly constitutes the shutter member which is mounted directly to the motor shaft. Finally, an appropriate top cover carrying the photo cell detector overlies the shutter member and is affixed to the mounting member so that the shutter member is sandwiched therebetween and will rotate between the light source and photo cell.

Because of the larger sized central opening of the mounting member relative to the motor shaft, in affixing the mounting member to the motor casing in a stationary position, it is essential that it be exactly coaxially centered relative to the motor shaft. That is, the outer circular periphery of the mounting member must be exactly concentric with the axis of the motor shaft. Otherwise, the rotating shutter which is affixed to the shaft will be out of alignment with the light passed from the light source to the photo cell all as described heretofore.

In view of the foregoing, it is customary to provide a centering means such as a bar with a V-groove affixed to the mounting member at the factory to permit exact centering of the mounting member prior to securing it to the motor. After securement of the mounting member, this centering bar or fixture can be disconnected. However, if it is ever desired to remove the optical encoder and place it on another motor or even reassemble it on the same motor, the mounting member must be sent back to the factory for proper securement of the bar fixture thereto in order that proper centering can again be achieved.

The foregoing problem has been solved in the provision of optical encoders in kit form in accord with the teachings of my prior U.S. Pat. No. 4,102,028 issued July 25, 1978. In my aforesaid patent, I disclose a centering fixture which can be provided with the kit and which functions to enable precise centering of the mounting member to a motor casing in order to solve the above-noted problems without having to send the assembly back to the factory.

However, effective operation of my centering fixture as described in the above noted patent depends on a precise central bore opening in the mounting member of a specific diameter. If the diameter of this central opening in the mounting member should be different, then a different centering fixture must be provided. Moreover, should there be any minor variations in the size of the central opening of the mounting fixture, the centering fixture as described in my above patent will not function properly.

BRIEF DESCRIPTION OF THE PRESENT INVENTION

With the foregoing considerations in mind, the present invention contemplates the provision of an improved centering fixture for optical encoders which does not rely on a consistent accurate bore diameter for the mounting member but rather is designed to precisely locate the center of the outer periphery relative to the center of the motor shaft to thereby assure the desired alignment of the encoder components.

More particularly, in accord with the present invention the mounting member carrying the light source has a circular periphery with first and second circumferentially spaced radial slots in exact radial alignment with the geommetrical center of its circular periphery and defining a given angle between radial lines from this center to the slots. The centering fixture itself comprises a V-shaped element having a bore at its vertex of diameter corresponding to the given diameter of the shaft to receive the motor shaft in a friction fit. The arms of the V-shape extend radially in alignment with the center of the bore at the heretofore referred to given angle and for a radial distance at least equal to the radius of the circular periphery of the mounting member.

With the foregoing arrangement, the motor shaft can be received in the bore at the vertex of the V-shape the ends of the arms of the V-shape being received in the slots of the mounting member. When so positioned, the mounting member is automatically precisely positioned in concentric relationship with the shaft so that it may then be secured to the motor with assurance that it will be in proper alignment with the remaining components of the encoder when the same are assembled after removing the V-shaped centering fixture.

Since the mounting member is indexed to its outer circular periphery, variations in the central opening surrounding the shaft of the motor will not affect proper positioning and appropriate alignment can thus be assured even should mounting members having different sized central openings be used.

BRIEF DESCRIPTION OF THE DRAWINGS

A better understanding of this invention will be had by referring to a preferred embodiment thereof illustrated in the accompanying drawings in which.

BRIEF DESCRIPTION OF THE PREFERRED EMBODIMENT

Figure 1:
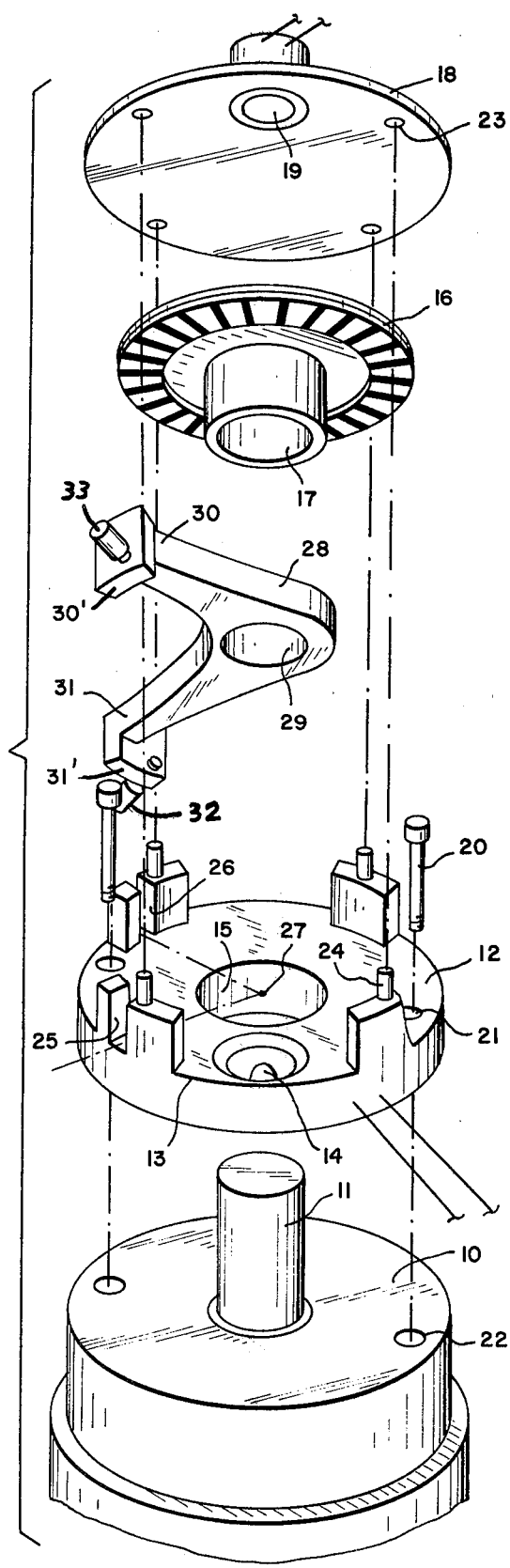
FIG. 1 is an exploded perspective view of the basic components making up an optical encoder together with the centering fixture of this invention preparatory to assembling the same on a motor.

Referring first to FIG. 1, there is shown in the lower portion of the exploded view a motor casing 10 with a shaft 11 projecting upwardly.

The optical encoder for use with the motor includes a mounting member 12 having a circular periphery 13 and carrying a light source 14 adjacent to a point on the periphery 13. Mounting member 12 further includes a central opening 15 of size greater than the diameter of the motor shaft 11 so as to surround the shaft without touching the shaft when the mounting member 12 is assembled on the motor casing 10.

Referring now to the upper portion of FIG. 1, there is shown a shutter 16 having a central hub portion 17 arranged to receive the shaft 11 in a friction fit.

The assembly is completed by the provision of a top cover 18 carrying a photo electric cell 19 adjacent to a peripheral point.

In the assembly of the optical encoder on the motor 10 the mounting member 12 is first positioned over the shaft 11 and then secured to the casing 10 as by means of appropriate screws passing through screw holes in the mounting member into tapped openings in the casing 10. One such screw is shown at 20 for passing through mounting member opening 21 into tapped hole 22.

The shutter 16 then has its central hub portion 17 forced over the protruding shaft 11 so that this shutter will rotate with the shaft. The cover member 18 is then positioned on top of the mounting member 12, the same being secured and located by appropriate holes and dowels. One such hole is shown at 23 for cooperation with a dowel 24 on the mounting member 12.

With the foregoing arrangement, the shutter 16 is sandwiched between the stationary mounting member 12 and top cover 18, appropriate light and dark areas on the shutter passing between the light source 14 and photo electric cell 19. The result is a modulated signal at a frequency corresponding to the R.P.M. of the motor shaft.

As mentioned heretofore, it is essential that the mounting member 12 be absolutely centered on the axis of the rotating shaft 11 in order that there will exist proper alignment between the light source 14, shutter 16 and photo electric cell 19. Since the central opening 15 is larger than the shaft 11 to avoid physical contact with the shaft, and since there is some play in the openings 21 in the mounting member receiving the screws 20, it cannot be assured that the mounting member 12 will be exactly centered when it is simply secured to the casing 10 by way of the screws.

In order to assure proper centering of the mounting member 12 in accord with the present invention, this mounting member is provided on its circular periphery 13 with first and second circumferentially spaced radial slots indicated at 25 and 26 in exact radial alignment with the geommetrical center of the circular periphery 13 and defining a given angle between radial lines drawn from the center to the slots. This angle in the embodiment illustrated is 90°.

A centering fixture itself is shown in the central portion of the exploded view of FIG. 1 at 28. This centering fixture comprises a V-shaped element having a bore 29 at its vertex of diameter corresponding to the given diameter of the shaft 11 to receive this shaft in a friction fit when a centering operation is to be carried out. The arms of the V are indicated at 30 and 31 and extend radially in alignment with the center of the bore 29 at the same given angle as that formed by the radial slots 25 and 26 described on the mounting member 12; that is, in the embodiment illustrated, 90°. The extent of the arms is for a radial distance at least equal to the radius of the circular periphery 13 of the mounting member. In the preferred embodiment illustrated, the radial extent of the arms is slightly greater so that the ends can be turned downwardly to define indexing stops such as indicated at 30' and 31' for the arms 30 and 31 respectively. These indexing stops are arranged to overlie and engage the circular periphery 13 of the mounting member 12 when the fixture 28 is utilized in centering the mounting member with respect to the shaft.

Figure 2:
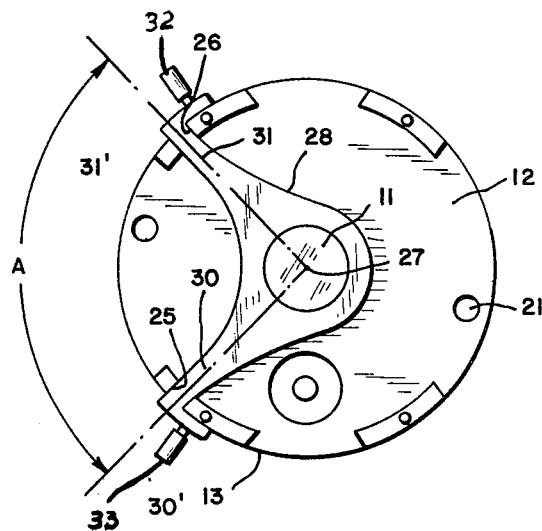
FIG. 2 is a top plan view looking along the axis of the motor shaft with the centering fixture in position on the mounting member illustrating a centering operation.

The foregoing will be better understood by referring to FIG. 2 which shows the centering fixture 28 on the shaft 11 with the radially extending arms 30 and 31 passing through the slots 25 and 26 and with their downturned ends constituting the indexing stops 30' and 31' engaging the circular periphery 13. The exact geometrical center of the circular periphery 13 is indicated at 27 and this point corresponds precisely with the center of the shaft 11 so that the fixture 12 is concentric with the shaft when positioned by the fixture 28 as illustrated. In this position, the screws described at 20 in FIG. 1 are then passed through the openings such as the opening 21 and tightened onto the casing 10 to secure the mounting member 12 in position. The fixture 28 is then removed and the remaining components in the form of the shutter 16 and the top cover 18 can then be assembled.

Since the radial distance of each of the arms 30 and 31 up to the indexing stop from the exact geometrical center of the bore opening 29 in the vertex of the V-shape is made precisely equal to the radial distance from the geometrical center 27 of the annular circular periphery 13 of the mounting member 12 to the periphery 13, then the mounting member 12 is necessarily exactly concentric with the shaft 11 when positioned by means of the fixture 28 as described in FIG. 2.

Figure 3:
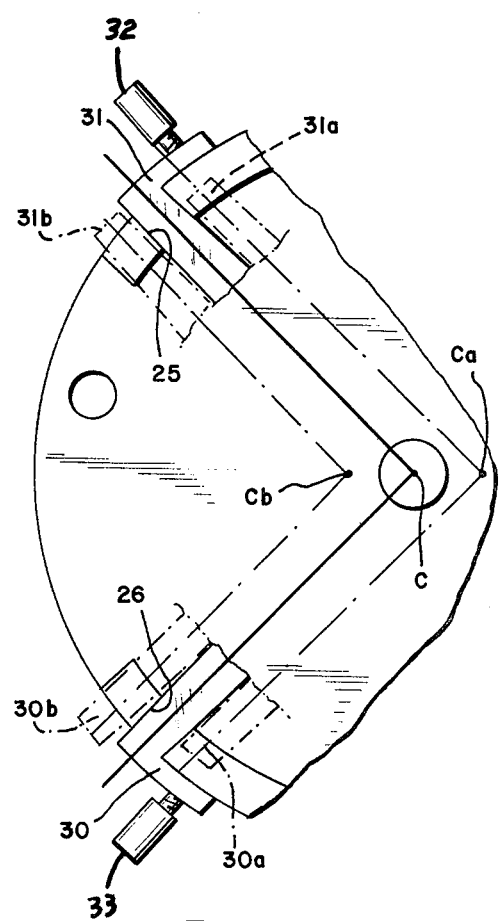
FIG. 3 is an enlarged fragmentary plan view schematically illustrating in greater detail the operation of the centering fixture.

The above can be better understood by referring to FIG. 3 wherein it will be noted that it is not possible for the fixture to be moved in a left or right direction to the indicated dotted line positions such as at 30a and 31a for the arms or 30b and 31b for the arms without engaging the edges of the slots 25 and 26. Thus, it is not possible for the fixture to assume a position wherein a center would occur at Ca or Cb rather than at the correct center C.

The same analysis occurs for an up and down translation of the fixture schematically depicted in FIG. 3, the side edges of the slots 25 and 26 again inhibiting such movement.

The only remaining possible misalignment which could occur with the fixture is a radial movement of one arm towards the center and a corresponding outward radial movement of the other arm. This motion, however, is inhibited by the indexing stops 30' and 31' which overlie the circular periphery 30 of the fixture. Set screws 32 and 33 may be provided to compensate for any dimensional changes in either or both the fixture and member 12.

An advantage of the general V-shape is the fact that the openings for receiving the screws such as the opening 21 described in FIG. 1 are fully exposed and not eclipsed in any manner by the presence of the fixture. Further, the fixture itself is of light weight and can be easily removed after the mounting member 12 has been secured to the casing 10. Thereafter, as described heretofore, the remaining components are assembled.

From all of the foregoing, it will thus be evident that the present invention has provided a very useful V-shaped centering fixture for use in assembling optical encoders.

I claim:

1. An optical encoder assembly and centering fixture to be used on a motor shaft of given diameter, including, in combination:

(a) a mounting member having a circular periphery with a light source adjacent to a point on said periphery and having a central opening of larger size than said given diameter of said shaft so as to surround such shaft without touching the shaft when the mounting member is secured to the motor, and wherein said light source is positioned at a proper radial distance from the axis of said shaft so as to fall into alignment with the remaining components of the assembly only when said mounting member is centered on the motor with said shaft extending through said central opening in exact concentric relationship with said circular periphery, said circular periphery having first and second circumferentially spaced radial slots in exact radial alignment with the geometrical center of said circular periphery and defining a given angle between radial lines drawn from said center to said slots; and (b) a centering fixture comprising a V-shaped element having a bore at the vertex at the V of diameter corresponding to said given diameter of said shaft to receive said shaft in a friction fit, said arms of the V-shape extending radially in alignment with the center of said bore at said given angle and for a radial distance at least equal to the radius of said circular periphery whereby when said motor shaft is received in said bore and the ends of the arms of the V-shaped received in said slots of said mounting member, said mounting member is centered and its circular periphery precisely concentric with said shaft so that it may be then secured to said motor with assurance that it will be in proper alignment with the remaining components of said encoder when the same are assembled after removing said centering fixture.

2. The subject matter of claim 1, in which said given angle formed by the arms of said V-shape is 90 degrees.

3. The subject matter of claim 1, in which the ends of said arms extend slightly beyond the radial distance from the center of said circular periphery to the periphery, and include stops extending downwardly for engaging the periphery of the mounting member to hold the arms in the slots against radial inward movement.

4. The subject matter of claim 3, in which said stops include set screws to compensate for dimensional changes.

* * * * *